US006552253B1

(12) United States Patent
Chen

(10) Patent No.: US 6,552,253 B1
(45) Date of Patent: Apr. 22, 2003

(54) STRUCTURE OF A RIM HOOP FOR POSITIONING

(76) Inventor: Ming-Huai Chen, PO Box 82-144, Taipei (TW)

( * ) Notice: Subject to any disclaimer, the term of this patent is extended or adjusted under 35 U.S.C. 154(b) by 0 days.

(21) Appl. No.: 10/011,401

(22) Filed: Dec. 11, 2001

(51) Int. Cl.[7] ................................................ G01D 13/02
(52) U.S. Cl. ........................................ 84/413; 84/411 R
(58) Field of Search ............................... 84/413, 411 R, 84/411 A, 421

(56) References Cited

U.S. PATENT DOCUMENTS 4,206,681 A * 6/1980 Kluczynski et al. ...... 84/411 R
4,295,405 A * 10/1981 Sleishman ................... 84/413
4,596,176 A * 6/1986 Gauger ........................ 84/421

FOREIGN PATENT DOCUMENTS

WO 9422129 * 9/1994

OTHER PUBLICATIONS

Bruno & Son, Inc Catalog No. 96.*
Musical catalog, Lark in the morning.*
Wexler, complete Catalog of Musical Instrument, No. 66.*

* cited by examiner

*Primary Examiner*—Shih-Yung Hsieh
(74) *Attorney, Agent, or Firm*—Leong C. Lei

(57) ABSTRACT

An improved structure of a rim hoop for positioning is disclosed. An improved structure of a rim hoop for positioning having a drum bell, a drum hoop for positioning a drum head bolts, and rim hoop and lug, characterized in that the lug is an arch-shaped structure including a straight shaft rod and a seat rod at the ends thereof, the lug is positioned at one side of the drum bell, the rim hoop is mounted onto the middle section of the shaft rod by means of an elastic circular pad such that the rim hoop and the lug are directly connected to the external ring surface of the drum bell, facilitating the drum bell to position the drum hoop with bolts fastening onto the lug.

3 Claims, 4 Drawing Sheets

STRUCTURE OF A RIM HOOP FOR POSITIONING

BACKGROUND OF THE INVENTION (a) Field of the Invention

The present invention relates to an improved structure of a rim hoop for positioning, and in particular, to a structure of a rim hoop being mounted onto a lug and then onto the drum bell so that the drum head of a drum can be replaced easily by removing the drum hoop. The sound quality produced from the drum will not be affected.

(b) Description of the Prior Art

The securing mechanism of a conventional drum structure, as shown in FIGS. 4 to 6 includes a drum bell 20 having a plurality of rows of through holes 21 for direct mounting onto a lug 22 being used as the securing device of drum head 23. One side of the drum bell 20 is provided with a rim hoop 25, facilitating the positioning of the drum at an appropriate height. The conventional rim hoop 25 is mounted to the drum hoop 24 for the drum head 23 with screw bolts 26. An elastic ring pad 27 is used to reduce the impact due to the vibration, the rim hoop 25. However, the rim hoop 25 is located between the drum and the drum support the vibration of the drum will affect the stability of the screw bolts 26 and as a result, the rim hood 25 may be loosened. Thus, the sound quality of the drum will be affected. Besides, if the drum hood 23 is to be replaced, the rim hoop 25 has to be removed before the drum hood 23 is replaced. Therefore, it is rather time-consuming and laborious to replace the drum head.

Accordingly, it is an object of the present invention to provide an improved structure of a rim hood for positioning, which mitigates the above-mentioned drawbacks.

SUMMARY OF THE INVENTION

The present invention relates to an improved structure of a rim hoop for positioning, and in particular, to a structure of a rim hoop being mounted onto a lug and then onto the drum bell so that the drum head of a drum can be replaced easily by removing the drum hoop. The sound quality produced from the drum will not be affected.

An aspect of the present invention is to provide an improved structure of a rim hoop for positioning having a drum bell, a drum hoop for positioning a drum head bolts, and rim hoop and lug, characterized in that the lug is an arch-shaped structure including a straight shaft rod and a seat rod at the ends thereof, the lug is positioned at one side of the drum bell, the rim hoop is mounted onto the middle section of the shaft rod by means of an elastic circular pad such that the rim hoop and the lug are directly connected to the external ring surface of the drum bell, facilitating the drum bell to position the drum hoop with bolts fastening onto the lug.

A further object of the present invention is to provide an improved structure of a rim hood for positioning, wherein protrusion and recess are formed at corresponding position of the hole edge at the seat rod of the lug and the end face of the stepped ring of the shaft rod, facilitating fixed directionpositioning and the center of the shaft rod of the lug is provided with a screw hole for the fastening of a screw bolt to lock the drum hoop.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PRESENT INVENTION

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figures 1, 1A:
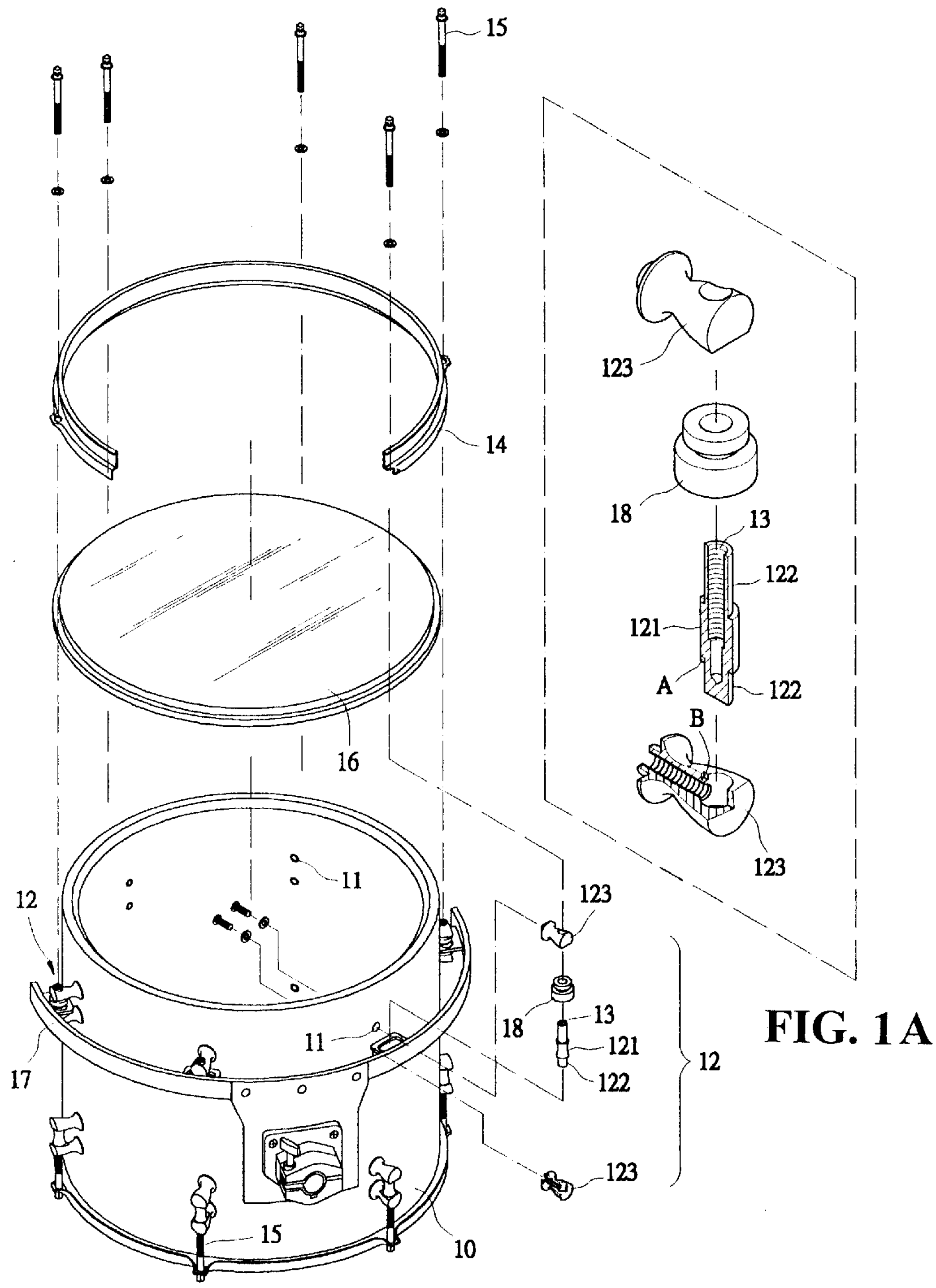
FIG. 1 is a perspective exploded view of the improved structure of a rim hood for positioning in accordance with the present invention.
FIG. 1A is an enlarged exploded view of a portion of FIG. 1.
Figure 2:
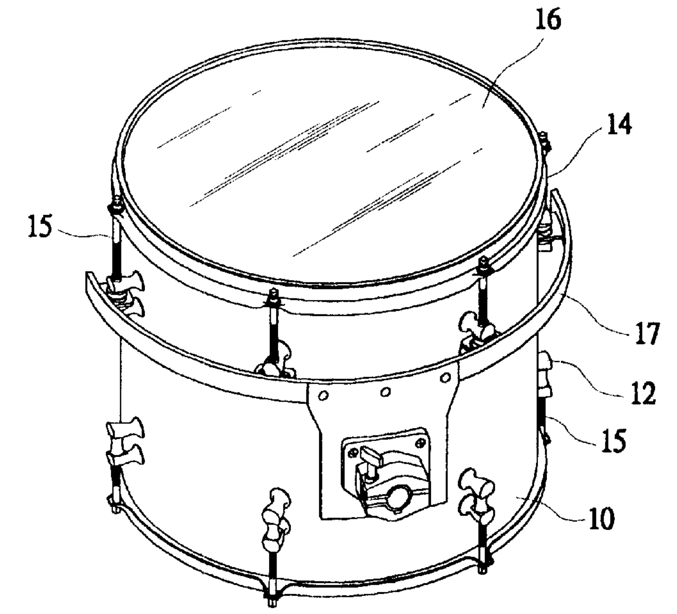
FIG. 2 is a perspective view of an improved structure of a rim hood for positioning in accordance with the present invention.
Figure 5:
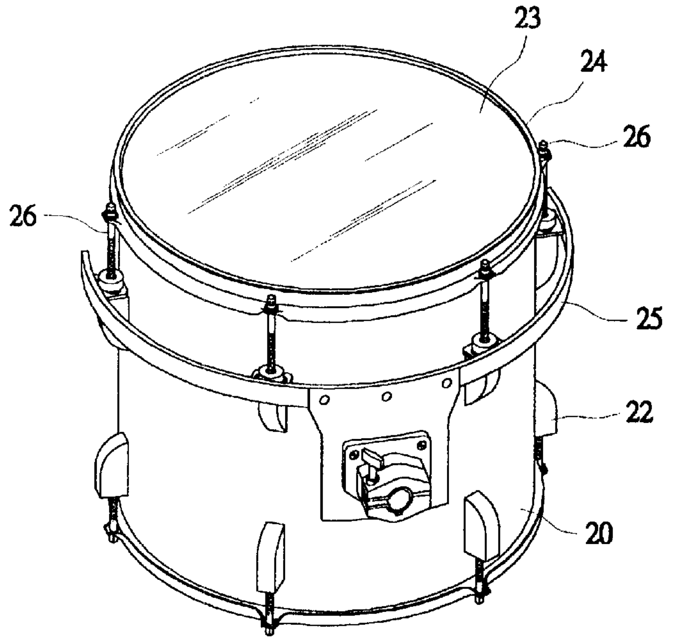
PRIOR ART FIG. 5
FIG. 5 is a perspective view of the conventional drum structure.
Figure 6:
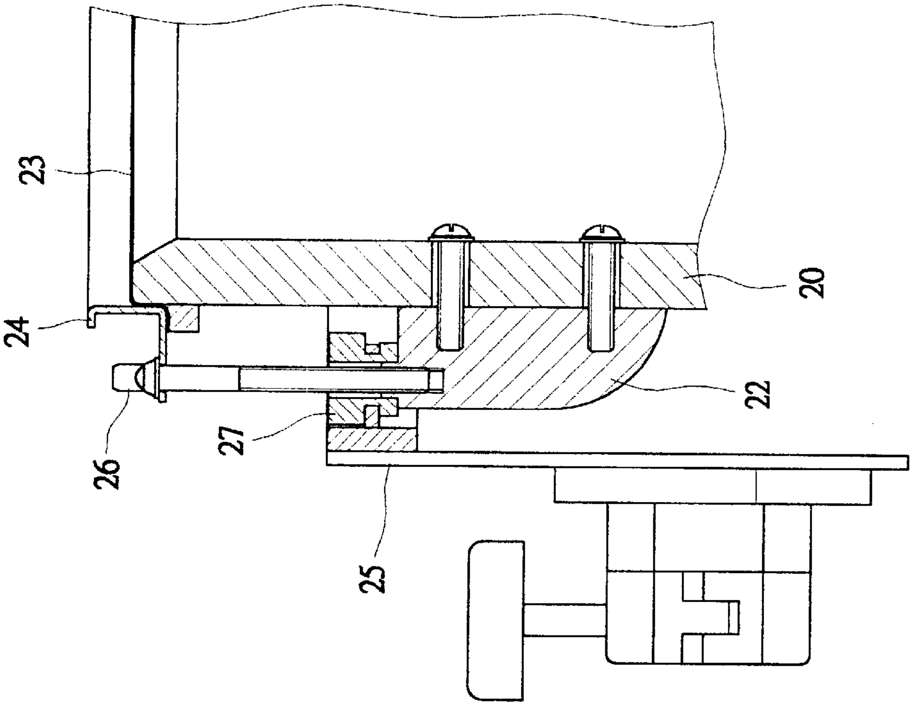
PRIOR ART FIG. 6
FIG. 6 is a sectional view showing the mounting of the drum with the conventional rim hoop.
Figure 3:
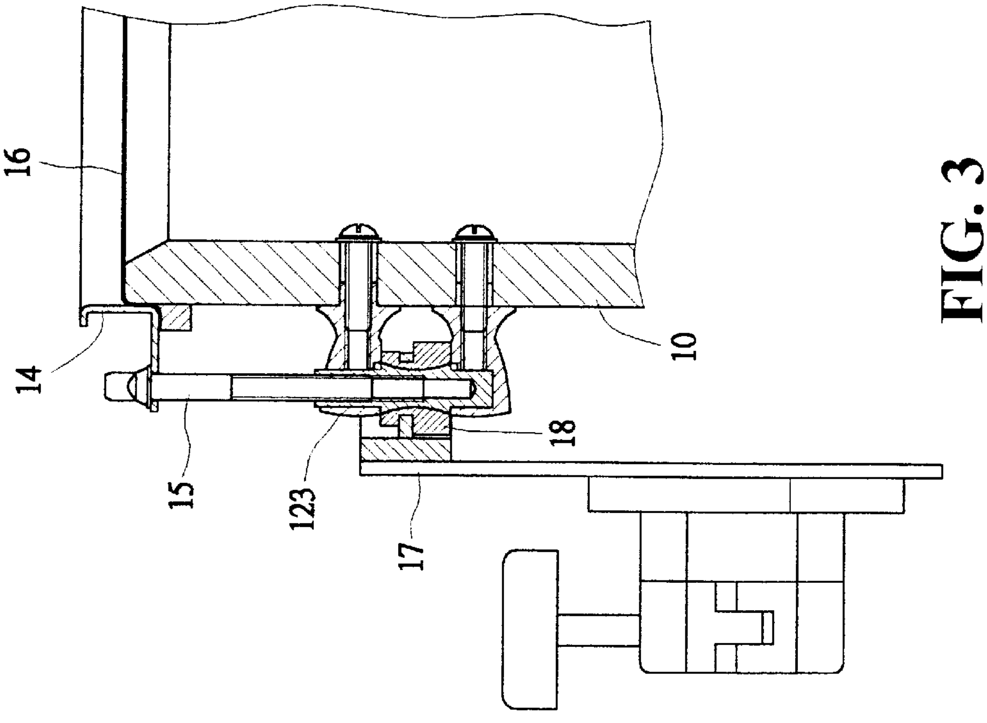
FIG. 3 is a sectional view showing the mounting of the drum with a rim hoop in accordance with the present invention.
Figure 4:
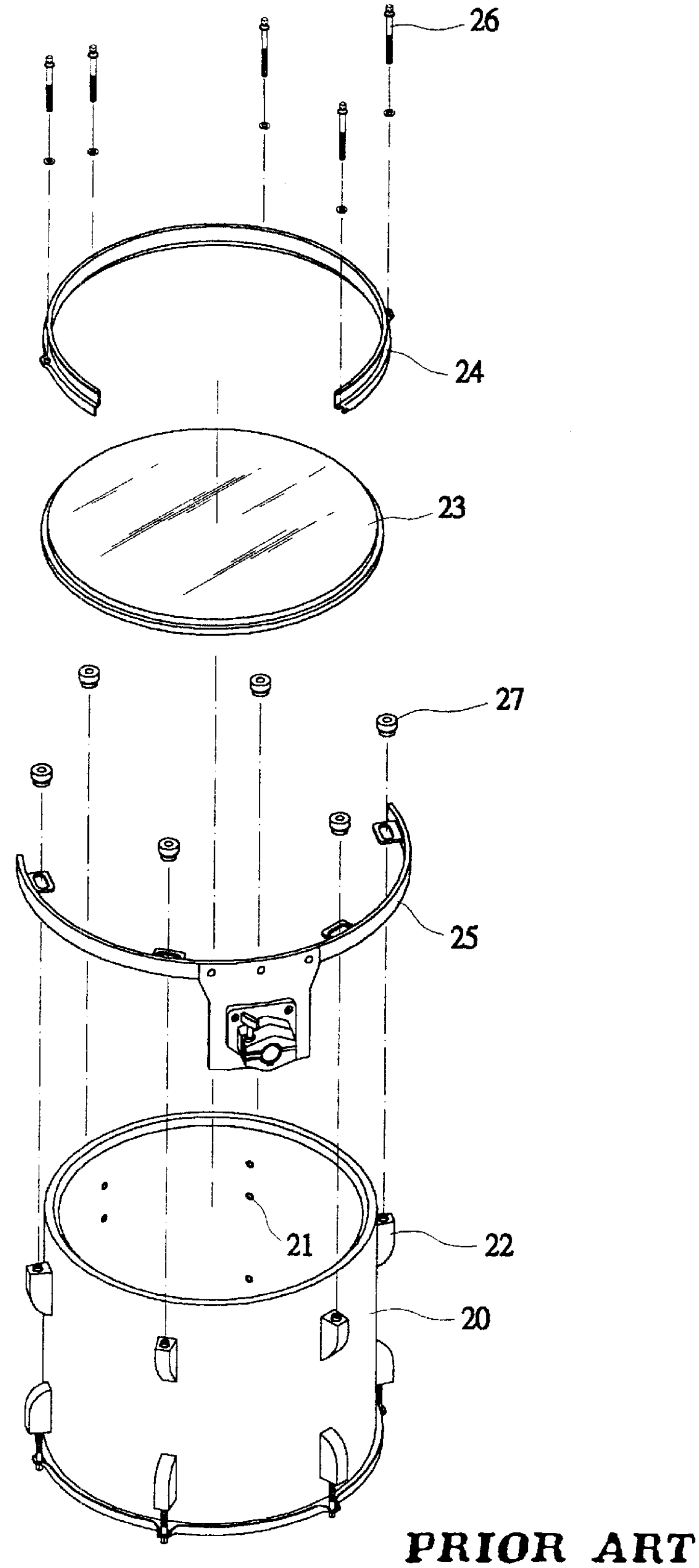
PRIOR ART FIG. 4
FIG. 4 is perspective exploded view of a conventional drum structure.

Referring to FIGS. 1, 1A, 2 and 3, there is shown an improved structure of a hoop rim for positioning in accordance with the present invention. The device includes an arch-shaped lugs 12 and a drum bell 10 having the external edge ring surface being provided with a plurality of through holes 11 arranged in rows for the securing of the lugs 12. The lug 12 has a straight shaft rod 121 having two ends being formed into a stepped ring 122. The two ends allow the mounting of a seat rod 123 having a screw hole 13 at the center thereof so that a screw bolt 15 for mounting with a drum hoop 14 can be directly mounted and allows adjustment of fastening of the drum head 16. A protrusion A and a recess B are provided at corresponding position on the hole edge of the seat rod 123 and the end face of the stepped ring 122 of the shaft rod 121 for easy mounting and positioning after the lug 12 is fixed thereto. Before the lug 12 is mounted to the drum bell 10, the rim hoop 17 is mounted at the middle section of the shaft rod 121, together with an elastic ring pad 18, the rim hoop 17 is directly mounted to the external ring face of the drum bell 10 with the lug 12.

In the process of mounting the drum head 16, after the drum head 16 is mounted to the end face of the drum bell 10, the drum hoop 14 is directly positioned, and securing screw bolts 15 are used to directly mount the lug 12 at the screw hole 13 onto the drum bell 10, and thus the entire drum head 16 is secured.

In accordance with the present invention, after the rim hoop 17 is fastened to the lug 12, the drum head 16 adjustably mounted by the drum hoop. 14 is then secured at the lug 12. The advantage of this structure is that if the entire drum head 16 is to be changed, only the drum hood 14 is loosen to remove the drum head 16. As the rim hoop 17 is secured to the lug 12 which is then fastened to the drum bell 10, the replacement of a drum head 16 does not require the removal of the rim hood 17. In application, as the rim hoop 17 is directly mounted to the lug 12, the rim hoop 17 will not shake when the drum bell 10 is impacted or in contact with other objects. In view of the above, the rim hoop 17 of the present invention provides a securing and positioning function to the drum, and also ensure the sound quality of the drum.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An improved structure of a rim hoop for positioning device comprising a drum bell, a drum hoop for positioning a drum head bolts, and rim hoop and lug, the lug is an arch-shaped structure including a straight shaft rod and a seat rod at the ends thereof, the lug is positioned at one side of the drum bell, the rim hoop is mounted onto the middle section of the shaft rod by means of an elastic circular pad such that the rim hoop and the lug are directly connected to the external ring surface of the drum bell, facilitating the drum bell to position the drum hoop with bolts fastening onto the lug.

2. The positioning device of claim 1, wherein protrusion and recess are formed at corresponding position of the hole edge at the seat rod of the lug and the end face of the stepped ring of the shaft rod, facilitating fixed direction positioning.

3. The positioning device of claim 1, wherein the center of the shaft rod of the lug is provided with a screw hole for the fastening of a screw bolt to lock the drum hoop.

* * * * *